(12) United States Patent
Hunt (10) Patent No.: US 11,510,365 B2
(45) Date of Patent: Nov. 29, 2022

(54) HARVESTING HEADER SEGMENT DISPLAY AND MAP

(71) Applicant: CNH Industrial America LLC, New Holland, PA (US)

(72) Inventor: Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 648 days.

(21) Appl. No.: 16/558,512

(22) Filed: Sep. 3, 2019

(65) Prior Publication Data

US 2021/0059117 A1 Mar. 4, 2021

(51) Int. Cl.
| | |
|---|---|
| *A01D 41/127* | (2006.01) |
| *A01B 79/00* | (2006.01) |
| *A01D 34/00* | (2006.01) |
| *A01D 41/14* | (2006.01) |
| *G05D 1/02* | (2020.01) |
| *G06F 3/0482* | (2013.01) |

(52) U.S. Cl.
CPC ........ *A01D 41/1271* (2013.01); *A01B 79/005* (2013.01); *A01D 34/006* (2013.01); *A01D 41/148* (2013.01); *G05D 1/0278* (2013.01); *G06F 3/0482* (2013.01); *G05D 2201/0201* (2013.01)

(58) Field of Classification Search
CPC .............. A01D 41/1271; A01D 34/006; A01D 41/148; A01D 41/14; A01D 41/141; A01D 41/144; A01B 79/005; G05D 1/0278; G05D 2201/0201; G06F 3/0482
See application file for complete search history.

(56) References Cited

U.S. PATENT DOCUMENTS

| | | | |
|---|---|---|---|
| 5,613,352 A | 3/1997 | Panoushek et al. | |
| 7,168,226 B2 | 1/2007 | McLean et al. | |
| 8,452,501 B1 | 5/2013 | Lange et al. | |
| 9,668,412 B2* | 6/2017 | Ritter | A01D 41/141 |
| 9,903,979 B2 | 2/2018 | Dybro et al. | |
| 2008/0295473 A1 | 12/2008 | Tippery et al. | |
| 2016/0316624 A1* | 11/2016 | Ritter | A01D 41/127 |
| 2017/0109395 A1* | 4/2017 | Farah | G06Q 10/0639 |
| 2019/0110394 A1 | 4/2019 | VanNahmen | |
| 2019/0110404 A1* | 4/2019 | Vandeven | A01D 69/03 |
| 2020/0396899 A1* | 12/2020 | Koch | A01D 41/1272 |

FOREIGN PATENT DOCUMENTS

| | | |
|---|---|---|
| EP | 3087819 A2 | 11/2016 |
| EP | 3278653 A1 | 2/2018 |
| WO | 2015038751 A1 | 3/2015 |
| WO | 2019/023312 A1 | 1/2019 |

OTHER PUBLICATIONS

PCT International Search Report and Written Opinion for PCT application PCT/US2020/048984, dated Nov. 30, 2020 (12 pages).

* cited by examiner

*Primary Examiner* — Frederick M Brushaber
(74) *Attorney, Agent, or Firm* — Peter Zacharias; Patrick Sheldrake (57) ABSTRACT

Method and apparatus for presenting information associated with a multi-segment header of an agricultural harvester. The operational states of the segments are monitored and used to present information. Examples of presented information include graphics depicting which segments are operational and which segments are non-operational, crop coverage maps, and crop yield maps.

20 Claims, 7 Drawing Sheets

HARVESTING HEADER SEGMENT DISPLAY AND MAP

FIELD OF THE INVENTION

Examples of the present invention relate generally to a header of a plant cutting machine (e.g., a harvester) and, more specifically, to displaying and mapping information associated with a multi-segment header.

BACKGROUND OF THE INVENTION

An agricultural harvester, e.g., a plant cutting machine, such as, but not limited to, a combine or a windrower, generally includes a header operable for severing and collecting plant or crop material as the harvester is driven over a crop field. In order to minimize harvesting time, the width of the header has been increased over the years to harvest more crop during each pass of the harvester.

As the widths of the headers have increased, multi-segment headers have been developed to more closely follow the contours of the field. Additionally, outward segments of these multi-segment headers may be raised to avoid flooded areas of a field that could bog down the header.

SUMMARY OF THE INVENTION

A harvesting apparatus that includes a harvester, a multi-segment header coupled to the harvester, the multi-segment header including at least one segment having multiple states of operation including an operational state and a non-operational state, positioning machinery configured to selectively position each of the at least one segment in one of the multiple states of operation; a display; a memory storing instructions; and a controller coupled to the memory, the display, and the positioning machinery, the instructions, when executed by the controller, configure the controller to selectively position, using the positioning machinery, each of the at least one segment in one of the multiple states of operation; determine, for each of the at least one segment, the respective one of the multiple states of operation for that segment; and present, on the display, the determined respective states of operation for each of the at least one segment.

A method for presenting information associated with a multi-segment header, the multi-segment header including at least one segment having multiple states of operation including an operational state and a non-operational state. The method includes selectively positioning each of the at least one segment in one of the multiple states of operation; determining, for each of the at least one segment, the respective one of the multiple states of operation for that segment; and present information associated with the determined respective states of operation for each of the at least one segment.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Reference will now be made in detail to the various examples of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The term "crop material" is used throughout the specification for convenience and it should be understood that this term is not intended to be limiting. The header of the subject application is applicable to a variety of crops, including but not limited to wheat, soybeans and small grains.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the signals or light.

The term "about" as used herein when referring to a measurable value such as an amount, a temporal duration, and the like, is meant to encompass variations of ±20%, ±10%, ±5%, ±1%, or ±0.1% from the specified value, as such variations are appropriate.

The term "substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the examples of the subject disclosure may be combined in any suitable manner in one or more embodiments. One skilled in the relevant art will recognize, in light of the description herein, that the subject disclosure can be practiced without one or more of the specific features or advantages of a particular example. In other instances, additional features and advantages may be recognized in certain embodiments that may not be present in all examples of the present disclosure.

Figure 1:
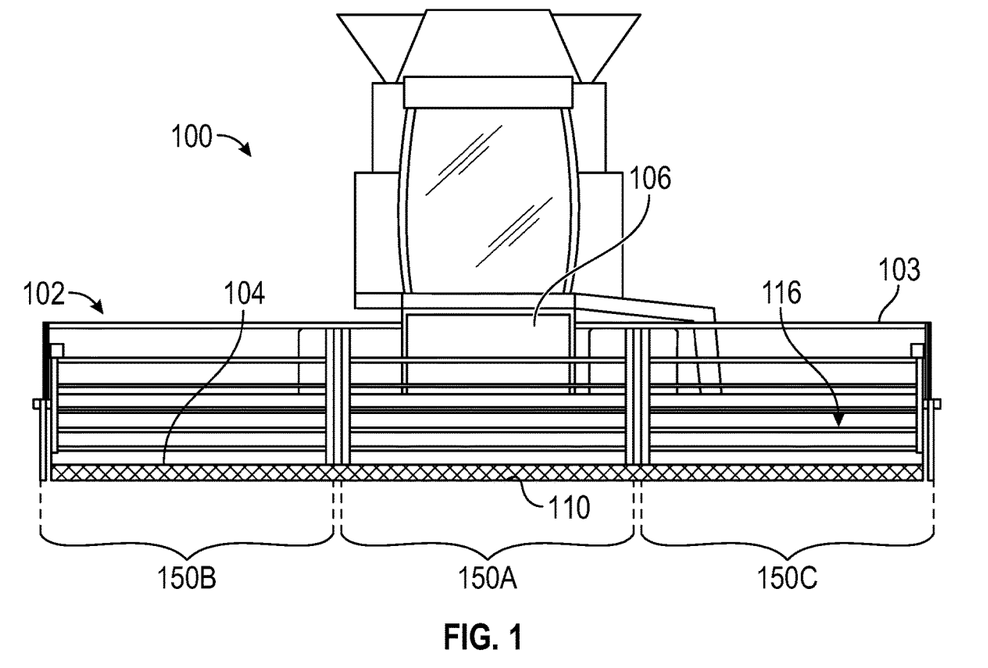
FIG. 1 is a front view of a harvester with attached multi-segment header in accordance with examples described herein.

Referring now to the drawings, FIG. 1 illustrates an agricultural harvester 100 in accordance with an example of the present disclosure. For exemplary purposes only, the agricultural harvester is illustrated as a combine harvester. The harvester 100 includes a header 102 attached to a forward end of the harvester, which is configured to cut crops, including (without limitation) small grains (e.g., wheat, soybeans, grain, etc.), and to induct the cut crops into a feederhouse 106 as the harvester moves forward over a crop field.

The header 102 is a multi-segment header including a center segment 150A, a right wing segment 150B adjacent a right side of the center segment 150A, and a left with segment 150C adjacent a left side of the center segment. The center segment 150A is positioned in front of the feederhouse 106 and may be raised/lowered with respect to the harvester 100. The right wing segment 150B and the left wing segment 150C may be raised/lowered to conform to the surface of the crop field. During normal operation, all three segments 150A/150B/150C are engaged in harvesting crop material from the crop field (referred to herein as the "operational state"). In certain situations, such as in an unusually wet/muddy portion of the crop field, the right and/or left wing segments 150B are raised such that they no longer effectively capture crop (referred to herein as a "raised state") in order to prevent the header 102 from getting bogged down in the crop field.

The header 102 includes a frame 103 having a floor 104 that is supported in desired proximity to the surface of a crop field. The center, right, and left segments 150A, 150B, and 150C extend transversely along a forward edge of the floor 104, i.e., in a widthwise direction of the harvester. The center, right, and left segments 150A, 150B, and 150C are configured to cut crops in preparation for induction into the feederhouse 106. The header 102 may include one or more draper conveyor belts for conveying cut crops to the feederhouse 106, which is configured to convey the cut crops into the harvester for threshing and cleaning as the harvester 100 moves forward over a crop field. The header 102 may include an elongated, rotatable reel 116 which extends above and in close proximity to the segments 150A, 150B, and 150C. The rotatable reel 116 is configured to cooperate with the one or more draper conveyors in conveying cut crops to the feederhouse 106 for threshing and cleaning. According to an example as shown in FIG. 1, a cutter bar 110 is positioned in front of the segments 150A, 150B, and 150C.

Figure 2A:
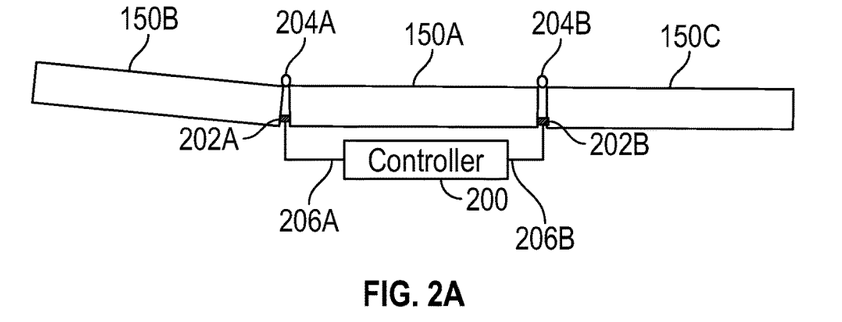
FIGS. 2A, 2B, 2C, and 2D are views of four respective states of a multi-segment header in accordance with examples described herein.
Figure 2B:
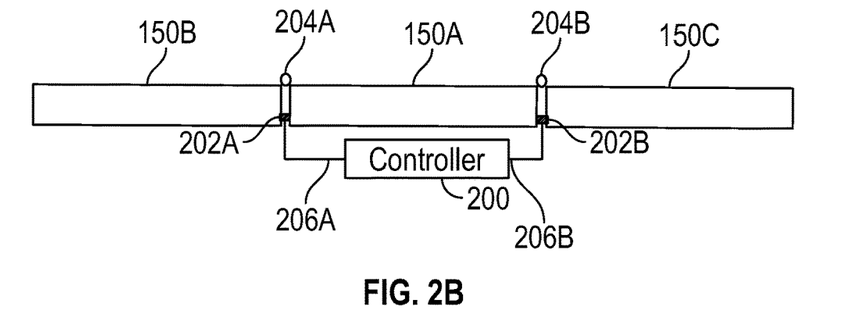
Figure 2C:
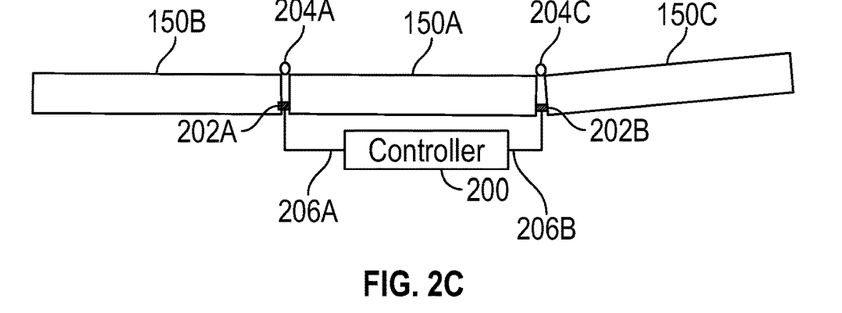
Figure 2D:
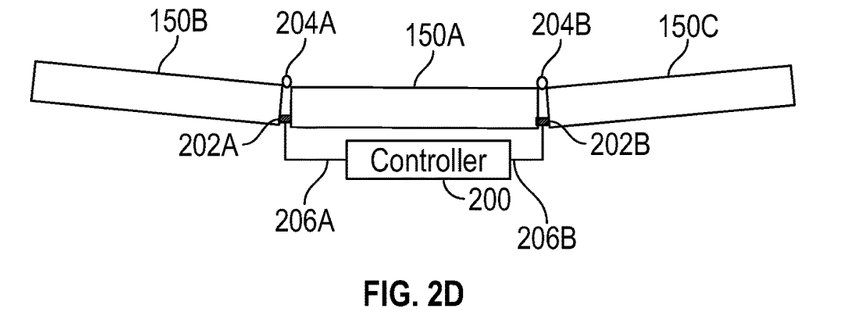

FIGS. 2A, 2B, 2C, and 2D depict the header 102 with its segments 150 in various states of operation. FIG. 2A depicts the header 102 with the center segment 150A and the left segment 150C in an operational state, and the right segment 150B in a non-operational state. FIG. 2B depicts the header 102 with all segments 150 in the operational state. FIG. 2C depicts the header 102 with the center segment 150A and the right segment 150B in an operational state, and the left segment 150C in a non-operational state. FIG. 2D depicts the header 102 with the center segment 150A in an operational state, and the left segment 150C and the right segment 150B in non-operational states.

In one example, positioning machinery including a hydraulic control apparatus 200 and hydraulic cylinders 202. The hydraulic control apparatus 200 (e.g., under control of a microprocessor of the harvester 100 or located in the header 102) controls a first hydraulic cylinder 202A positioned between the center segment 150A and the right segment 150B and a second hydraulic cylinder 202A positioned between the center segment 150A and the left segment 150C. The controller 200 controls the flow of hydraulic fluid through respective first and second fluid lines 206A and 206B to the first and second hydraulic cylinders 202A and 202B.

Increasing the pressure in the first fluid line 206A causes the hydraulic cylinder 202A to extend, which results in the right wing segment 150B raising with respect to the center segment 150A (and into a non-operational state) as it rotates about a pivot point 204A therebetween. Decreasing the pressure in the first fluid line 206A causes the hydraulic cylinder 202A to retract, which results in the right wing segment 150B lowering with respect to the center segment 150A (and into an operational state). Increasing the pressure in the second fluid line 206B causes the hydraulic cylinder 202B to extend, which results in the left wing segment 150C raising with respect to the center segment 150A (and into a non-operational state) as it rotates about a pivot point 204B therebetween. Decreasing the pressure in the second fluid line 206A causes the hydraulic cylinder 202B to retract, which results in the left wing segment 150C lowering with respect to the center segment 150A (and into an operational state).

Figure 3A:
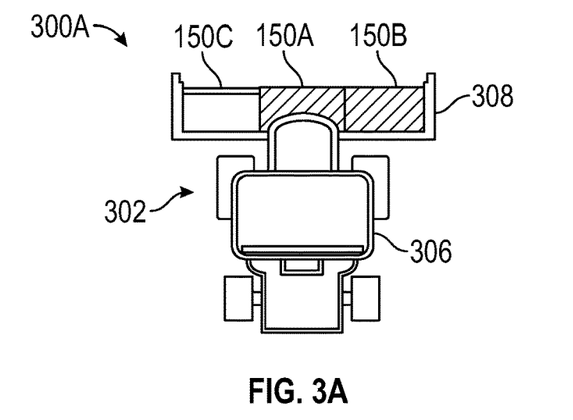
FIGS. 3A, 3B, and 3C are graphical user interfaces associated with respective states of a multi-segment header in accordance with examples described herein.
Figure 3B:
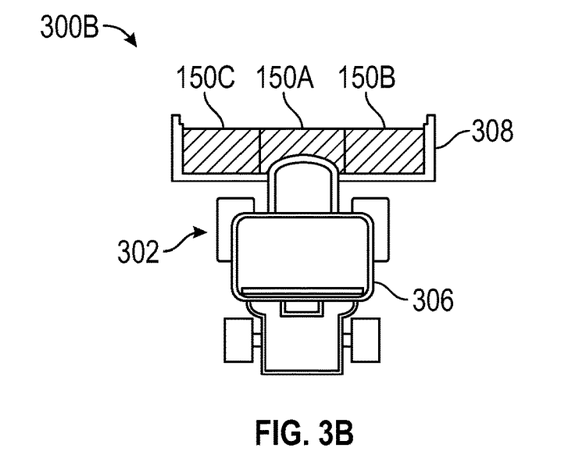
Figure 3C:
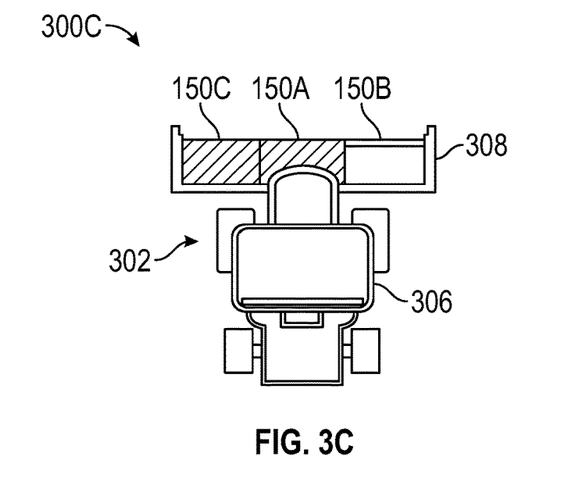

FIGS. 3A, 3B, and 3C depict graphical user interfaces (GUIs) associated with the header 103 with its segments 150 in various states of operation. The GUI 300A depicted in FIG. 3A includes a harvesting apparatus image 302 of a harvester 306 and a multi-segment header 308 with the left segment 150C represented in a non-operational state (e.g., in a first color such as grey) and the center and right segments 150A and 150B represented in an operational state (e.g., in a second color such as yellow). The GUI 300B depicted in FIG. 3B has all segments 150 represented in an operational state. The GUI 300C depicted in FIG. 3C has the right segment 150B represented in a non-operational state and the center and left segments 150A and 150C represented in an operational state.

Figure 4A:
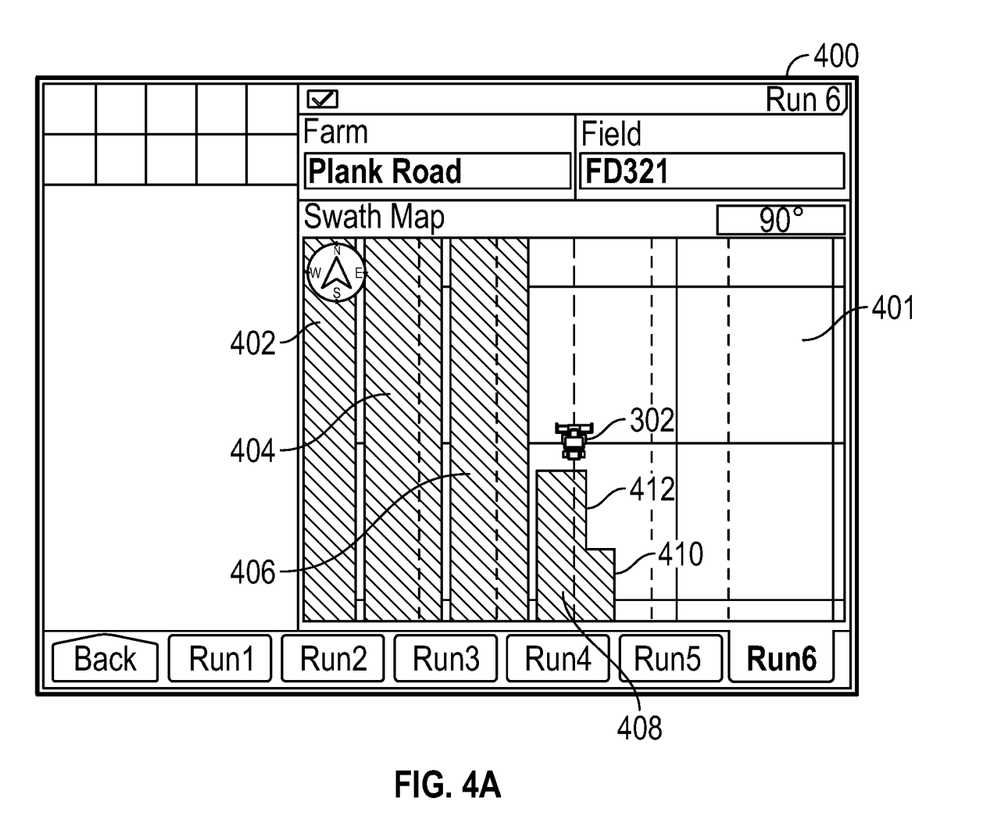
FIGS. 4A and 4B are illustrations of a swath map and a yield map associated with a multi-segment header in accordance with examples described herein.

FIG. 4A depicts an example of a swath map 400. The illustrated swath map 400 includes a harvesting apparatus image 302 and swaths of a crop field 401 completed. The swaths including a first swath 402, a second swath 404, and a third swath 406 that are fully complete and a fourth swath 408 that is partially complete. The fourth swath 408 includes a relatively wide portion 410 (corresponding to all segments 150 in an operational state) and a relatively narrower portion 412 (corresponding to the center and left sections 150A and 150C being in an operational state, and the right section 150B being in a non-operation state, which reduces the width of a portion of the swath 408). In one example, a generic harvesting apparatus image may be depicted regardless of the state of operation such as seen in FIG. 4A. In another example, the harvesting apparatus image 302 of the right section raised GUI 300C (FIG. 3C) may be illustrated, which corresponds to the swath width of the fourth swath 408 currently being harvested. The transition from the portion 410 to the portion 412 results from the right segment 150 entering the non-operational state at that point in the crop field 401.

Figure 4B:
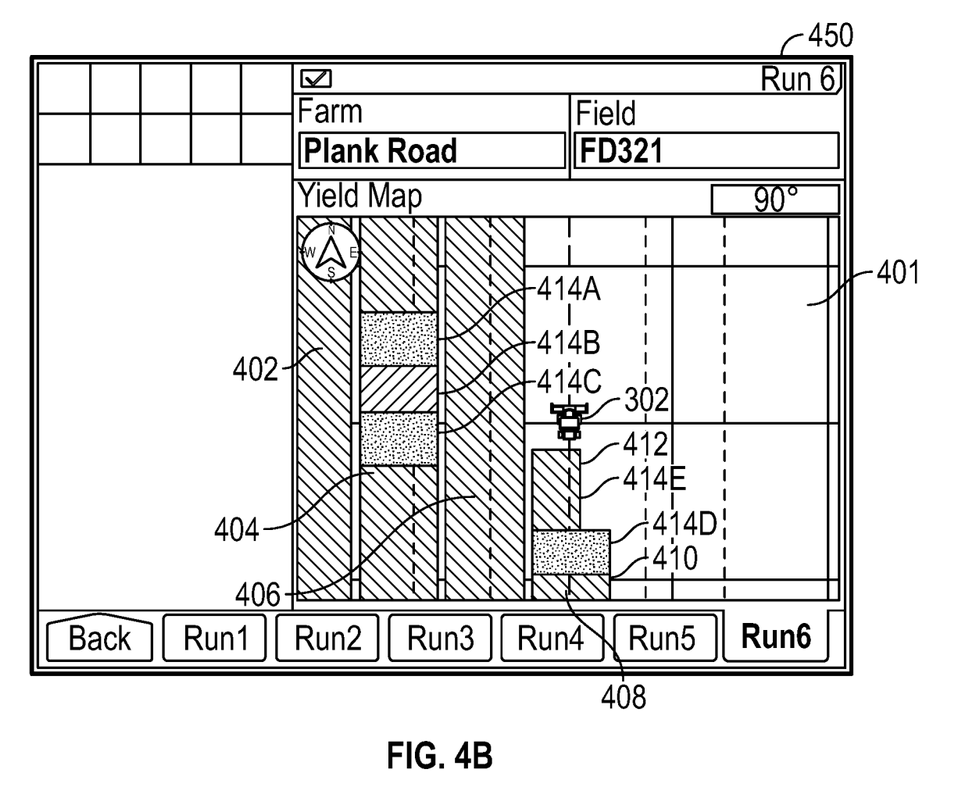

FIG. 4B depicts an example of a crop yield map 450. The illustrated crop yield map 450 includes a harvesting apparatus image 302 and swaths of a crop field 401 completed along with associated yield information (e.g., low, medium, and high). The yield information may be determined by crop yield sensors in the harvester 100 (e.g., positioned in the feeder housing 106 or elsewhere). Low yield may be represented in a first color (e.g., red), medium yield may be represented in a second color (e.g., yellow) and high yield may be represented in a third color (e.g., green). In the illustrated crop yield map 450 a majority of the fully and partially completed swaths are illustrated as high yield. Some portions, such as portions 414A, 414C, and 414D, are illustrated as medium yield and other portions, such as portion 414B, are illustrated as low yield. As with the swath map 400 in FIG. 4A, in one example, a generic harvesting apparatus image may be depicted regardless of the state of operation. In another example, the harvesting apparatus image 302 of the right section raised GUI 300C (FIG. 3C) may be illustrated, which corresponds to the swath width of the fourth swath 408 currently being harvested.

The illustrated crop yield map 450 takes the operational state of the header segments 150 into consideration. In an example, the crop yield is divided by the number of segments in an operational state and is then compared to threshold values (e.g., with 70-100% of the threshold associated with high yield, 30-70% of the threshold associated with medium yield, and 0-30% of the threshold associated with low yield). In accordance with this example, the yield depicted in portion 414D is medium yield when all segments 150 are operational. However, raising the right segment 150B may result in portion 414E being indicated as a high yield if the amount of crop being harvested is relatively high for only ⅔ of the header segments 150 being operational. This can be useful in future crop planning since this may be indicative of the area of the crop filed 401 associated with the right segment 150B in that area being too wet, for example.

Figure 5:
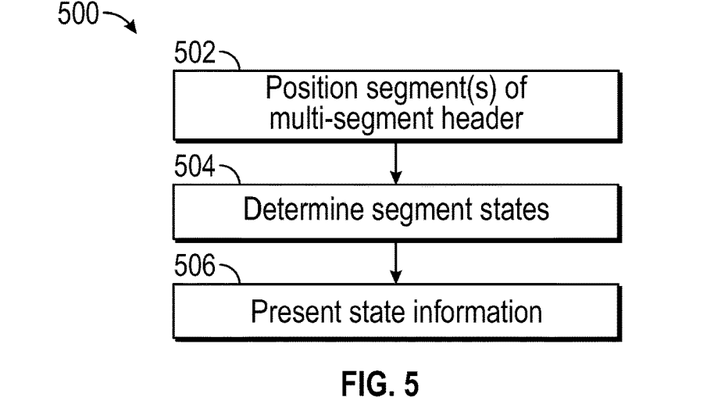
FIG. 5 is a flow chart for depicting information associated with a multi-segment header in accordance with examples described herein.
Figure 6A:
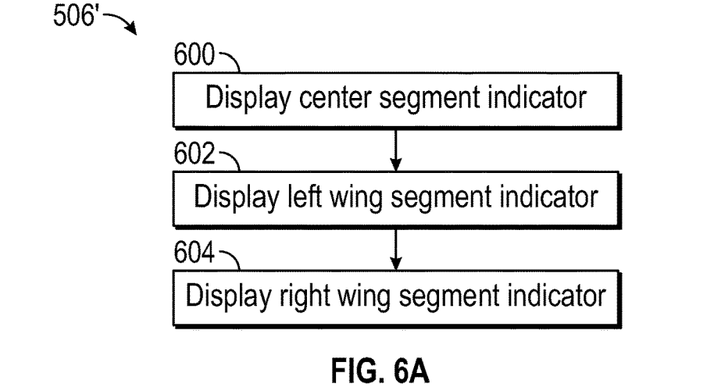
FIGS. 6A and 6B are flow charts for presenting information associated with a multi-segment header in accordance with examples described herein.
Figure 6B:
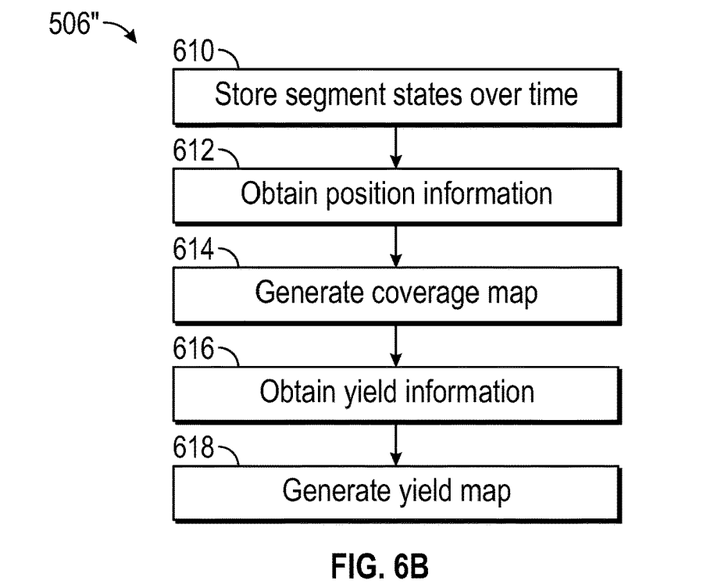
Figure 7:
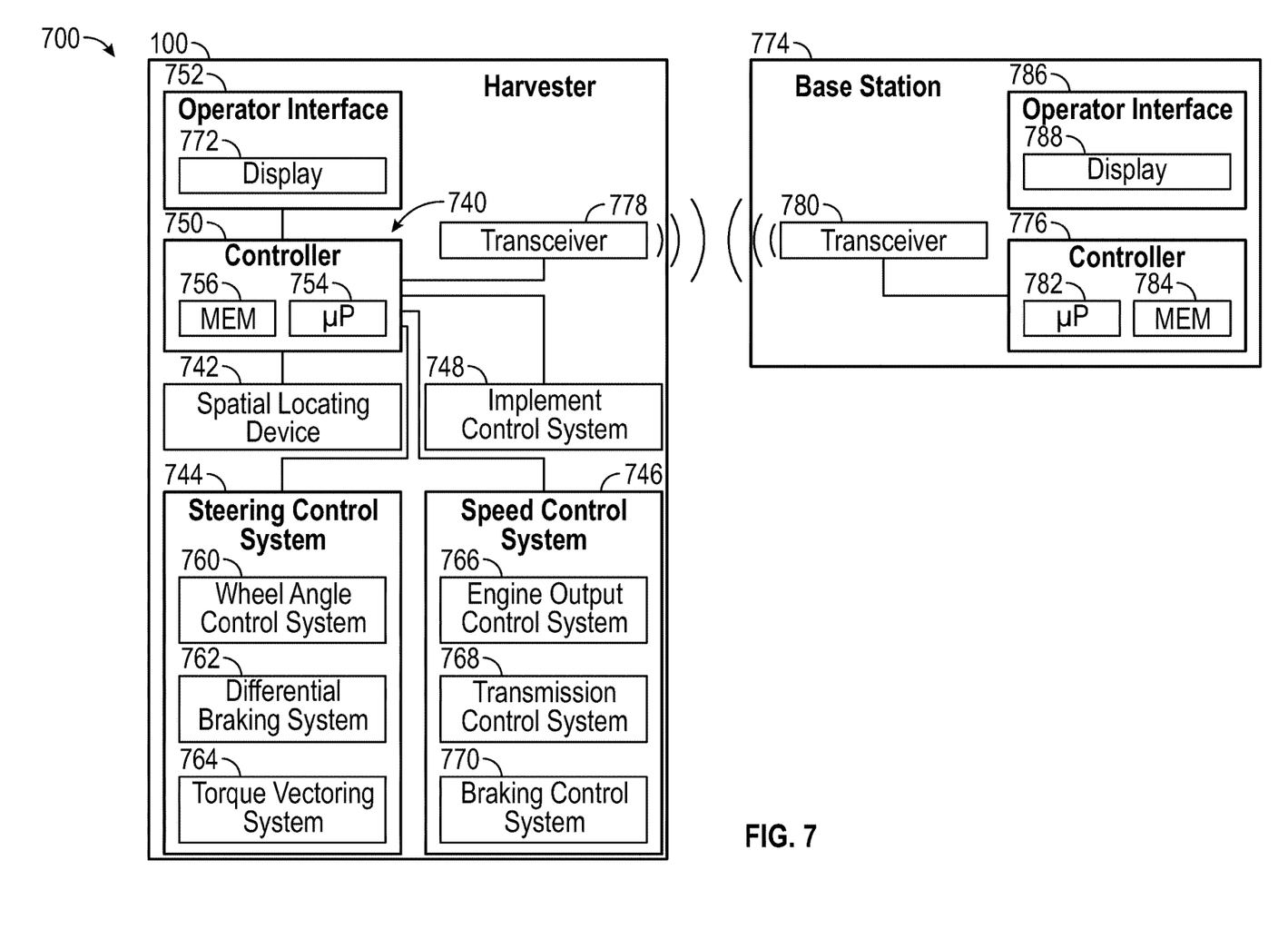
FIG. 7 is a block diagram depicting components for use in implementing apparatus and examples described herein.

FIGS. 5, 6A, and 6B depict flow charts of example steps for positioning a multi-segment header and presenting information associated with a multi-segment header. The steps may be performed by a processor (e.g., microprocessor 754 and/or 782; FIG. 7) executing instruction stored in a memory (e.g., memory 756 and/or 784). The steps are described with reference to hardware described herein, but are not to be limited to such implementations. Although shown as occurring serially, the blocks of FIGS. 5, 6A, and 6B may be reordered or parallelized depending on the implementation. Furthermore, one of skill in the art will understand from the description herein that one or more steps/blocks may be omitted and one or more additional/alternative steps may be incorporated.

At block 502, position segments of a multi-segment header. Microprocessor 754/782 may position each of segments 150A-C via hydraulic controller 200 in an operational or non-operational state. Center segment 150A may be transported in a non-operational state and lowered with respect to the harvester 100 into an operational state. Once center segment 150A is in an operational state, each of the right and left segments 150B and 150C may be lowered with respect to the center segments 150A from a non-operational state into an operational state or raised with respect to the center segments 150A from the operational state into the non-operational state (e.g., to avoid getting bogged down). It is to be understood that while in the operational state, the right and left segments 150B and 150C may be raised/lowered within a defined range to follow the contour of the crop field.

At block 504, determine segment states. Microprocessor 754/782 may determine the state of each of segments 150A-C. In one example, the microprocessor 754/782 may determine the state by tracking the instructions for positioning the segments in block 502 and storing the tracked instructions in a look-up table. In another example, microprocessor 754/782 may determine the state based on sensors (not shown) positioned on the header (e.g., between the segments 150A/B and 150A/C) to detect an angular relationship with an adjacent segment for interpretation by the microprocessor 754/782.

At block 506, present segment state information. Microprocessor 754/782 may present state information for each of segments 150A-C on a display (e.g., display 772/788; FIG. 7). In one example, segment state information is presented on a display (see flow chart 506'; FIG. 6A). In another example, segment state information is used in the generation of a swath/coverage map 400 or a yield map 450 for presentation on a display (see flow chart 506"; FIG. 6B).

Referring to FIG. 6A, at block 600, display an indicator associated with the state of the center segment 150A. Microprocessor 754/782 may present state information of the center segment 150A by depicting a GUI 300 on the display 772/788 including a header 308 with pixels corresponding to the center segment 150A illuminated in a particular manner representing its state (e.g., with a first color associated with an operational state such as yellow and a second color associated with a non-operational state such as grey; or a first illumination pattern associated with an operational state such as blinking and a second illumination pattern associated with a non-operational state such as non-blinking or blinking at a different rate).

At block 602, display an indicator associated with the state of the left segment 150C. Microprocessor 754/782 may present state information of the left segment 150C by depicting a GUI 300 on the display 772/788 including a header 308 with pixels corresponding to the left segment 150C illuminated in a particular manner representing its state.

At block 604, display an indicator associated with the state of the right segment 150B. Microprocessor 754/782 may present state information of the right segment 150B by depicting a GUI 300 on the display 772/788 including a header 308 with pixels corresponding to the right segment 150B illuminated in a particular manner representing its state.

Referring to FIG. 6B, at block 610, store segment states over a period of time. The period of time may be a period of time associated with harvesting a particular crop field of portion thereof. Microprocessor 754/782 may store segment states in a look-up table in memory 756/784.

At block 612, obtain position information. Microprocessor 754/782 may obtain position information for the harvester 100 from spatial locating device 742 (FIG. 7). Position information may include a location parameter for the harvester 100 corresponding to a location within the crop field 401 and a time stamp corresponding to the point in time at which the harvester 100 was at that location.

At block 614, generate a swath/coverage map. Microprocessor 754/782 may generate a swath/coverage map 400 based on the current state of the segments 150 over time. As one or more segments (e.g., segments 150B or 150C) are transitioned into an operational state the depicted swath width increases and as one or more segments (e.g., segments 150B or 150C) are transitioned into a non-operational state the depicted swath width decreases.

At block 616, obtain yield information. Microprocessor 754/782 may obtain and store yield information for the harvester 100 from one or more yield sensors (not shown; e.g., positioned in feeder housing 106 or another portion of the harvester 100). Yield information may include a volumetric parameter. Microprocessor 754/782 may store a time stamp corresponding to when the yield parameter was obtained, e.g., for use in matching the yield information to the number of segments in an operational state at the time the yield information was obtained.

At block 618, generate a yield map depicting yield quality. Microprocessor 754/782 may generate a yield map 450 based on the current yield and the current state of the segments 150 over time. As one or more segments (e.g., segments 150B or 150C) are transitioned into an operational state the equation for generating the yield quality is changed such that the yield is divided by a larger number. As one or more segments (e.g., segments 150B or 150C) are transitioned into a non-operational state the equation for generating the yield quality is changed such that the yield is divided by a smaller number. In one example, assuming there are three equal-width segments, when all three segments are in an operational state, the yield is divided by three to determine the yield quality for the portion of the crop field 401 being harvested at that time. When there are only two segments in an operational state, however, the yield is divided by two to determine the yield quality for the portion of the crop field 401 being harvested at that time. In another example, the yield quality is determined by dividing the yield by the number of operational segments divided by the total number of segments (e.g., dividing by ⅔ for two operational segments in a three equal-width segment header). Thus, for the same yield sensed, the yield map 450 may show a higher yield quality when only two segments 150 are operational than when all three segments are operational. Adjustments to the equations can be made to accommodate more/fewer segments and/or unequal segment widths.

FIG. 7 is a schematic diagram of an embodiment of a control system 700 that may be utilized to iteratively calculate virtual paths, control the harvester 100, control the header 102, and/or present information (e.g., by implementing algorithms such as the algorithms depicted and described with reference to FIGS. 5, 6A, and 6B). In the illustrated example, the control system 700 includes a vehicle control system 740 (e.g., mounted on the harvester 100). In the illustrated embodiment, the harvester 100 includes a spatial locating device 742, which is mounted to the harvester 100 and is configured to determine a position of the harvester 100. The spatial locating device 742 may also be configured to determine a heading and/or a speed of the harvester 100, for example. As will be appreciated, the spatial locating device 742 may include any suitable system configured to determine the position and/or other characteristics of the harvester 100, such as a global positioning system (GPS) or global navigation satellite system (GNSS), for example. In certain examples, the spatial locating device 742 may be configured to determine the position and/or other characteristics of the harvester 100 relative to a fixed point within the field (e.g., via a fixed radio transceiver). Accordingly, the spatial locating device 742 may be configured to determine the position of the harvester 100 relative to a fixed global coordinate system (e.g., via the GPS or GNSS) or a fixed local coordinate system.

In the illustrated example, the harvester 100 includes a steering control system 744 configured to control a direction of movement of the harvester 100, and a speed control system 746 configured to control a speed of the harvester 100. In addition, the harvester 100 includes an implement control system 748 configured to control operation of an implement (operational state of the header segments 150). Furthermore, the control system 740 includes a controller 750 communicatively coupled to the spatial locating device 742, to the steering control system 744, to the speed control system 746, and to the implement control system 748.

In some examples, the controller 750 is configured to receive a first signal indicative of a position of the harvester 100 (e.g., from the spatial locating device 742) and to receive a second signal indicative of the desired path (e.g., input by the operator via an operator interface 752). In some examples, the controller 750 may receive additional signals indicative of characteristics of the harvester 100 (e.g., current speed, turning radius limits, steering angle limits, steering angle rate limits, steering angle, roll, pitch, rotational rates, acceleration, or any combination thereof). In certain embodiments, the controller 750 may be configured to calculate a target position along a desired path. As discussed below, the controller 750 may be configured to calculate a virtual path between the current position and the target position 20, and to output a third signal indicative of an initial curvature of the virtual path. The third signal may be provided to the steering control system 744, which is configured to adjust the steering angle of the harvester 100 based on the initial curvature to guide the harvester 100 toward the desired path. The controller 750 may iteratively calculate the target position and/or the virtual paths and adjust the steering angle based on the respective initial curvature of each virtual path as the harvester 100 moves toward the desired path. In some examples, the controller 750 may iteratively calculate virtual paths at intervals less than or equal to approximately 0.01, 0.02, 0.03, 0.04, 0.05, or 0.1 seconds.

In some examples, the controller 750 is an electronic controller having electrical circuitry configured to process data from the spatial locating device 742, among other components of the harvester 100. In the illustrated example, the controller 750 includes a processor, such as the illustrated microprocessor 754, and a memory device 756. The controller 750 may also include one or more storage devices and/or other suitable components. The processor 754 may be used to execute software, such as software for calculating the target position, iteratively calculating virtual paths, controlling the harvester 100, and so forth. Moreover, the processor 754 may include multiple microprocessors, one or more "general-purpose" microprocessors, one or more special-purpose microprocessors, and/or one or more application specific integrated circuits (ASICS), or some combination thereof. For example, the processor 754 may include one or more reduced instruction set (RISC) processors.

The memory device 756 may include a volatile memory, such as random access memory (RAM), and/or a nonvolatile memory, such as ROM. The memory device 756 may store a variety of information and may be used for various purposes. For example, the memory device 56 may store processor-executable instructions (e.g., firmware or software) for the processor 754 to execute, such as instructions for calculating the target position, iteratively calculating virtual paths, and/or controlling the harvester 100. The storage device (s) (e.g., nonvolatile storage) may include read-only memory (ROM), flash memory, a hard drive, or any other suitable optical, magnetic, or solid-state storage medium, or a combination thereof. The storage device (s) may store data (e.g., field maps, maps of desired paths, vehicle characteristics, etc.), instructions (e.g., software or firmware for calculating the target position, iteratively calculating virtual paths, controlling the harvester, etc.), and any other suitable data.

As shown, the steering control system 44 includes a wheel angle control system 760, a differential braking system 762, and a torque vectoring system 764 that may be used to steer (e.g., adjust the steering angle) the harvester 100, in accordance with the disclosed embodiments. The wheel angle control system 760 may automatically rotate one or more wheels or tracks of the harvester 100 (e.g., via hydraulic actuators) to steer the harvester 100 based at least in part on the initial curvature of the virtual path. By way of example, the wheel angle control system 60 may rotate front wheels/tracks, rear wheels/tracks, and/or intermediate wheels/tracks of the harvester 100, either individually or in groups. The differential braking system 62 may independently vary the braking force on each lateral side of the harvester 100 to direct the harvester 100. Similarly, the torque vectoring system 764 may differentially apply torque from the engine to wheels and/or tracks on each lateral side of the harvester 100. While the illustrated steering control system 744 includes the wheel angle control system 760, the differential braking system 762, and the torque vectoring system 764, it should be appreciated that alternative embodiments may include one or two of these systems, in any suitable combination. Further embodiments may include a steering control system 744 having other and/or additional systems to facilitate directing the harvester 100 based at least in part on respective initial curvatures of the iteratively calculated virtual paths (e.g., an articulated steering system, differential drive system, etc.), for example.

In the illustrated example, the speed control system 746 includes an engine output control system 766, a transmission control system 768, and a braking control system 770. The engine output control system 766 is configured to vary the output of the engine to control the speed of the harvester 100. For example, the engine output control system 766 may vary a throttle setting of the engine, a fuel/air mixture of the engine, a timing of the engine, and/or other suitable engine parameters to control engine output. In addition, the transmission control system 768 may adjust gear selection within a transmission to control the speed of the harvester 100. Furthermore, the braking control system 770 may adjust braking force, thereby controlling the speed of the harvester 100. While the illustrated speed control system 746 includes the engine output control system 66, the transmission control system 768, and the braking control system 770, it should be appreciated that alternative embodiments may include one or two of these systems, in any suitable combination. Further embodiments may include a speed control system 746 having other and/or additional systems to facilitate adjusting the speed of the harvester 100.

The implement control system 748 is configured to control various parameters of the agricultural implement towed by or integrated within the harvester 100. For example, in certain examples, the implement control system 748 may be configured to instruct an implement controller (e.g., via a communication link, such as a CAN bus or ISOBUS) to adjust a penetration depth of at least one ground engaging tool of the agricultural implement, which may reduce the draft load on the harvester 100. Furthermore, the implement control system 48 may instruct the implement controller to transition the agricultural implement between a working position and a transport portion, to adjust a flow rate of product from the agricultural implement, to adjust a position of a header of the agricultural implement (e.g., a harvester, etc.), or to adjust which segments of a multi-segment header are operations/non-operational, among other operations.

In the illustrated example, the operator interface 752 may be communicatively coupled to the controller 750. The operator interface 752 is configured to present data from the harvester 100 and/or the agricultural implement to an operator (e.g., data associated with operation of the harvester 100, data associated with operation of the agricultural implement, a position of the harvester 100, a speed of the harvester 100, the desired path, the virtual paths, the target position, the current position, etc.) via a display 772. The operator interface 752 may also be configured to enable an operator to control certain functions of the harvester 100 (e.g., starting and stopping the harvester 100, inputting the desired path, etc.). In some examples, the operator interface 752 may enable the operator to input parameters that cause the controller 750 to adjust the virtual paths. For example, the operator may provide an input requesting that the desired path be acquired as quickly as possible, that the speed of the harvester 100 remain within certain limits, or the like. In addition, the operator interface 752 (e.g., via the display 772, via an audio system, etc.) may be configured to alert an operator of error conditions, for example.

It should be appreciated that in certain embodiments, the control system 40 may include a base station 774 having a base station controller 776 located remotely from the harvester 100. For example, in certain examples, control functions of the control system may be distributed between the controller 750 of the harvester 100 and the base station controller 776. In some examples, the base station controller 776 may perform a substantial portion of the control functions of the control system. For example, in some examples, a first transceiver 778 positioned on the harvester 100 may output signals indicative of vehicle characteristics (e.g., the speed, maximum turning rate, minimum turning radius, steering angle, roll, pitch, rotational rates, acceleration, or any combination thereof), the position, and/or the heading of the harvester 100 to a second transceiver 780 at the base station 774. In such examples, the base station controller 776 may iteratively calculate virtual paths and output control signals to control the steering control system 744, the speed control system 746, and/or the implement control system 748 to direct the harvester 100 toward the desired path, for example. The base station control 776 may have a processor 782 and memory device 784 having all or some of the features and/or capabilities of the processor 754 and the memory device 756 discussed above. In some examples, the base station 774 may include an operator interface 786 having a display 788, which may have all or some of the features and/or capabilities of the operator interface 752 and the display 772 discussed above.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A harvesting apparatus comprising:
   a harvester;
   a multi-segment header coupled to the harvester, the multi-segment header including at least two segments, each segment having multiple states of operation including an operational state and a non-operational state;
   positioning machinery configured to selectively position each of the at least two segments in one of the multiple states of operation;
   a display;
   a memory storing instructions; and
   a controller coupled to the memory, the display, and the positioning machinery, the instructions, when executed by the controller, configure the controller to:
   selectively position, using the positioning machinery, each of the at least two segments in one of the multiple states of operation;
   determine, for each of the at least two segments, whether that segment is in the operational state or the non-operational state; and
   present, on the display, the determined respective states of operation for each of the at least two segments, by presenting a first indicator that corresponds to the operational state when the respective segment is determined to be in the operational state and a second indicator that correspond to the non-operational state when the respective segment is determined to be in the non-operational state.

2. The apparatus of claim 1, wherein the instructions to present configure the controller to:
   graphically display on a display, for each of the at least two segments, the first indicator that corresponds to the operational state when the respective segment is determined to be in the operational state and a second indicator that correspond to the non-operational state when the respective segment is determined to be in the non-operational state.

3. The apparatus of claim 2, wherein the at least two segments include a left wing segment and a right wing segment, wherein the multi-segment header includes a center segment, the left wing segment rotatably coupled to the center segment, and the right wing segment rotatably coupled to the center segment, and wherein the instruction to graphically display the respective states of operation configure the controller to:
   display the first indicator with a first color;
   display the second indicator with a second color.

4. The apparatus of claim 3, further comprising:
   a graphical user interface (GUI) configured to depict a harvester image and multiple regions adjacent the harvester image, each of the multiple regions corresponding to a respective one of the multiple segments of the multi-segment header.

5. The apparatus of claim 1, wherein at least one of the display or the controller are remote to the harvester and the multi-segment header.

6. The apparatus of claim 1, further comprising a global positioning system (GPS) receiver coupled to the controller and wherein the instructions further configure the controller to:
   store the determined respective states of operation for each of the at least two segments over a time period;
   obtain from the GPS receiver GPS coordinates associated with the harvester over the time period; and
   generate a coverage map depicting segments in the operational state in a first manner and segments in the non-operational state in a second manner different from the first manner over time;
   wherein the instructions configuring the controller to present comprises instructions to configure the controller to:
   graphically display the coverage map.

7. The apparatus of claim 6, further comprising a yield sensor, wherein the instructions further configure the controller to:
   obtain from the yield sensor, yield information associated with the harvester over the time period; and
   generate a yield map depicting yield information over time along with segment state of operation;
   wherein the instructions configuring the controller to present comprises instructions to configure the controller to:
   graphically display the yield map.

8. The apparatus of claim 7, wherein the yield sensor is a mass flow sensor.

9. A method for presenting information associated with a multi-segment header coupled to a harvester, the multi-segment header including at least two segments, each segment having multiple states of operation including an operational state and a non-operational state, the method comprising:
   selectively positioning each of the at least two segments in one of the multiple states of operation;
   determining, for each of the at least two segments, whether that segment is in the operational state or the non-operational state; and
   presenting, for each of the at least two segments, a first indicator that corresponds to the operational state when the respective segment is determined to be in the operational state and a second indicator that correspond to the non-operational state when the respective segment is determined to be in the non-operational state.

10. The method of claim 9, wherein the presenting comprises:
    graphically displaying, for each of the at least two segments, the first indicator that corresponds to the operational state when the respective segment is determined to be in the operational state and a second indicator that correspond to the non-operational state when the respective segment is determined to be in the non-operational state.

11. The method of claim 10, wherein the at least two segments include a left wing segment and a right wing segment, wherein the multi-segment header includes a center segment, the left wing segment rotatably coupled to the center segment, and the right wing segment rotatably coupled to the center segment, and wherein the graphically displaying comprises:
    displaying the first indicator with a first color;
    displaying the second indicator with a second color.

12. The method of claim 11, wherein the presenting comprises:

presenting a graphical user interface (GUI) configured to depict a harvester image and multiple regions adjacent the harvester image, each of the multiple region corresponding to a respective one of the multiple segments of the multi-segment header.

13. The method of claim 9, wherein the method further comprises:
storing the determined respective states of operation for each of the at least two segments over a time period;
obtaining global positioning system (GPS) coordinates associated with the harvester over the time period; and
generating a coverage map depicting segments in the operational state in a first manner and segments in the non-operational state in a second manner different from the first manner;
wherein the presenting comprises graphically displaying the coverage map.

14. The method of claim 13, further comprising:
obtaining from a yield sensor, yield information associated with the harvester over the time period; and
generating a yield map depicting yield information over the time period along with the segment state of operation;
wherein the presenting comprises graphically displaying the yield map.

15. The method of claim 14, wherein the yield sensor is a mass flow sensor coupled to the harvester and wherein the obtaining the yield information comprises obtaining the yield information from the mass flow sensor.

16. The method of claim 9, further comprising:
transmitting signals between the multi-segment header and a controller configured to control the multi-segment header and present the information associated with the determined respective states of operation for each of the at least one segment.

17. A non-transitory computer readable medium storing program code for use with a multi-segment header coupled to a harvester, the multi-segment header including at least two segments, each segment having multiple states of operation including an operational state and a non-operational state, the program code, when executed, is operative to cause a computing device to perform the steps of:
selectively positioning each of the at least two segments in one of the multiple states of operation;
determining, for each of the at least two segments, whether that segment is in the operational state or the non-operational state; and
present information associated with the determined respective states of operation for each of the at least two segments, by presenting a first indicator that corresponds to the operational state when the respective segment is determined to be in the operational state and a second indicator that correspond to the non-operational state when the respective segment is determined to be in the non-operational state.

18. The non-transitory computer readable medium as specified in claim 17, wherein the program code, when executed, is operative to cause the computing device to perform the steps of:
storing the determined respective states of operation for each of the at least two segments over a time period;
obtaining global positioning system (GPS) coordinates associated with the harvester over the time period; and
generating a coverage map depicting segments in the operational state in a first manner and segments in the non-operational state in a second manner different from the first manner;
wherein the presenting comprises graphically displaying the coverage map.

19. The non-transitory computer readable medium as specified in claim 18, wherein the program code, when executed, is operative to cause the computing device to perform the steps of:
obtaining from a yield sensor, yield information associated with the harvester over the time period; and
generating a yield map depicting yield information over the time period along with the segment state of operation;
wherein the presenting comprises graphically displaying the yield map.

20. The non-transitory computer readable medium as specified in claim 17, wherein the program code, when executed, is operative to cause the computing device to perform the steps of:
transmitting signals between the multi-segment header and a controller configured to control the multi-segment header and present the information associated with the determined respective states of operation for each of the at least one segment.

* * * * *